July 16, 1963 R. N. RHODES 3,098,170

POWER SUPPLY CIRCUIT FOR TELEVISION RECEIVERS

Filed Nov. 20, 1961 2 Sheets-Sheet 1

INVENTOR.
ROLAND N. RHODES
BY
W. H. Sprungle
ATTORNEY

July 16, 1963 R. N. RHODES 3,098,170

POWER SUPPLY CIRCUIT FOR TELEVISION RECEIVERS

Filed Nov. 20, 1961 2 Sheets-Sheet 2

INVENTOR.
ROLAND N. RHODES
BY
W. H. Sprague
ATTORNEY

United States Patent Office 3,098,170

Patented July 16, 1963

3,098,170

POWER SUPPLY CIRCUIT FOR TELEVISION RECEIVERS

Roland N. Rhodes, Levittown, Pa., assignor to Radio Corporation of America, a corporation of Delaware Filed Nov. 20, 1961, Ser. No. 153,285

6 Claims. (Cl. 315—13)

This invention relates to circuits for the generation of direct voltages, and more particularly to direct voltage generating circuits to supply operating potentials to a color image reproducing cathode ray tube in a color television receiver.

One type of color image display cathode ray tube that may be used in a color television receiver has an image reproducing phosphor screen that emits light under electron beam excitation in which the color of the light emitted is dependent on the velocity of the electrons that excite the screen. This type of cathode ray tube may be referred to as a "penetration color tube," because the color of the light emitted may be dependent upon the depth to which the electrons penetrate into the screen structure before they are stopped to emit light. The screen of the penetration color tube is capable of producing light of two or more colors when excited simultaneously by two or more electron beams having different velocities. In this manner, each beam produces substantially only one of the colors that the screen is capable of producing. Each electron beam is modulated in current intensity with signals representative of the particular color that the beam is to produce. All of the beams are simultaneously deflected by a common deflection fixed to scan a raster on the screen of the tube as is conventional in television receivers. An image in color is thereby produced.

In order to accelerate a plurality of separate electron beams in the same tube to different velocities it has been found practical to maintain the final accelerating anode (ultor) of each of the separate electron guns that produce the electron beams at the same direct potential and to maintain the cathodes of each of the electron guns at different direct potentials. By this means, the electron beams from the different electron guns are accelerated through different potentials and thus acquire different velocities. When using a cathode ray tube having three electron guns and a phosphor screen (such, for example, as shown and described in U.S. Patent No. 2,590,018, issued on March 18, 1952, to L. R. Koller et al., and entitled "Production of Colored Images") that provides three colors, such as blue, green, and red, the differences in accelerating potentials for the three electron guns may be of the order of several thousand volts.

The "flyback" direct voltage power supply circuits that are used in present day commercial, black and white and color television receivers rectify the retrace or "flyback" pulses that are generated in the horizontal deflection circuits of the receiver to generate the ultor or final accelerating anode voltage for the electron gun or guns of the image reproducing cathode ray tube. In black and white receivers only one electron gun is used, and in present color receivers using the shadow mask color television tube, the cathodes of the three electron guns are maintained at substantially the same direct potential. Thus, only one ultor or electron accelerating voltage is required. In the penetration color tube, however, using three electron guns, at least three direct voltage sources are required, that is, the ultor voltage together with direct voltage sources for at least two of the electron guns, since, only one of the electron guns may be maintained at or near the reference potential (ground) of the receiver.

In accordance with one embodiment of the invention, a penetration color tube is used in a color television receiver as a color image display device. The tube has a plurality of electron guns, the cathodes of which are to be maintained at different direct potentials. The direct voltage generating circuits for supplying the direct potentials include a first rectifier for rectifying a portion of the horizontal flyback pulse of the horizontal deflection system of the receiver to provide a first direct potential, positive with respect to ground, for the cathode of a first electron gun of the tube which supplies a relatively low velocity electron beam. A second rectifier for supplying the final anode accelerating (ultor) voltage is connected to rectify a further portion of the flyback pulse to provide a direct voltage which is added to the first rectifier direct voltage to provide the ultor voltage. The cathode of a second electron gun, which supplies an electron beam having a greater velocity than that of the first electron gun, is connected to ground for the receiver.

Further, a third rectifier may be connected to rectify a portion of the flyback pulse to derive a third direct voltage, negative with respect to ground, to supply voltage to the cathode of a third electron gun that emits an electron beam having a velocity greater than the other electron beams. Focus voltages for the electron guns, if required, are derived from a bleeder circuit connected across the various high voltage supply circuits.

The invention may be further understood from the following detailed description, when read in connection with the accompanying drawings, in which.

Figure 1:
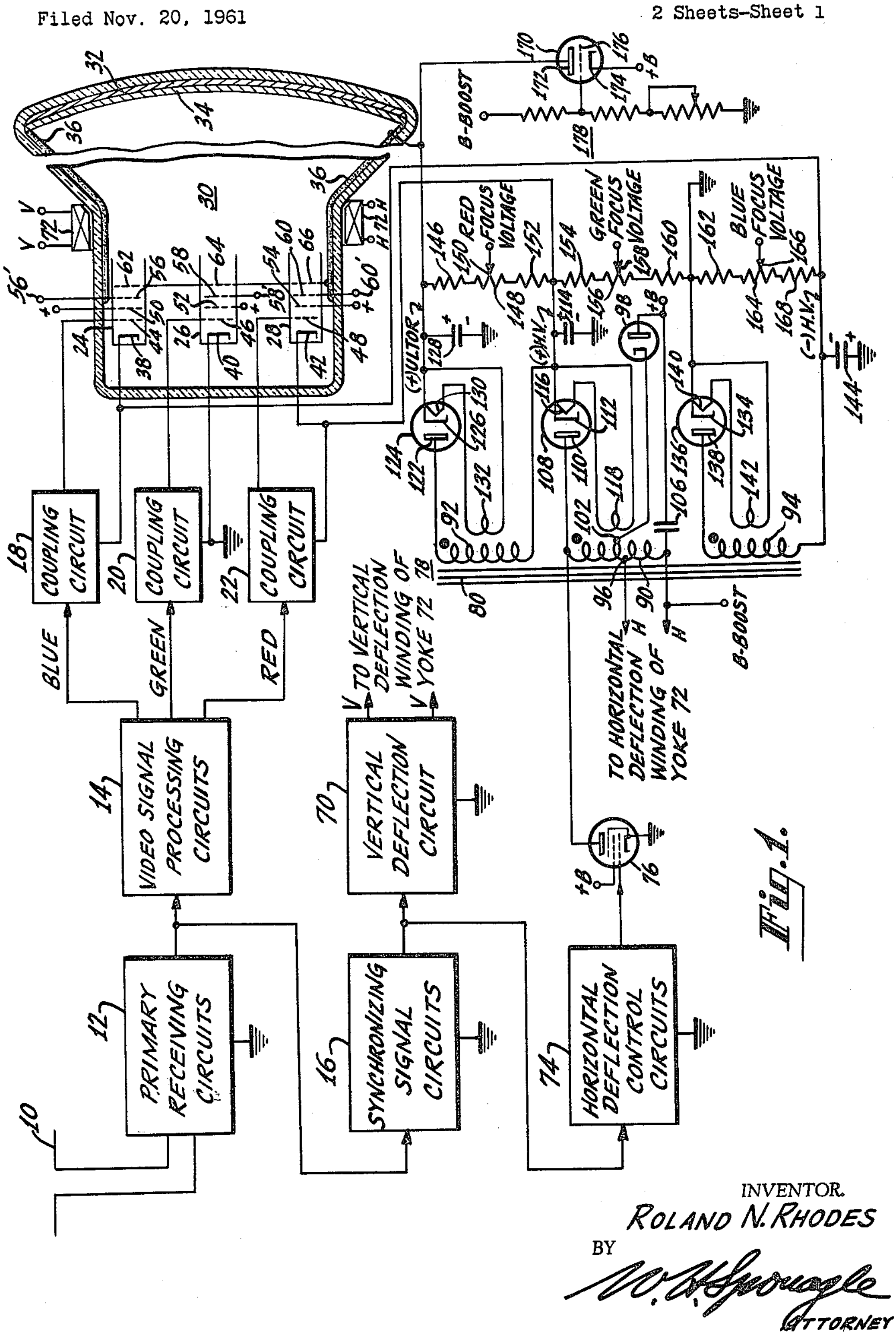
FIGURE 1 is a schematic and block diagram of a television receiver circuit having a high voltage supply circuit in accordance with the invention.

Referring now to the drawings, the television receiver illustrated in FIGURE 1 includes an antenna 10 to receive and supply a radio frequency color television wave to the primary receiving circuits 12 of the receiver, which include a tuner, IF amplifier, video detector, video amplifier, and AGC circuits, and which may be of the type that is well known and used in present day color and black and white commercial television receivers. The primary receiving circuits 12 develop and supply a composite color video signal, detected from the color television radio frequency wave, to video signal processing circuits 14 and synchronizing signal circuits 16 for the receiver. The video signal processing circuits 14 convert the composite color video signal to electrical signals representative of the blue, green and red components of the image to be reproduced by the color television receiver. The video signal processing circuits 14 may use any of the many methods known in the art for producing the blue, green and red representative signals, such as that shown and described in U.S. Patent 2,925,462 issued to D. H. Pritchard et al., on February 16, 1960, and entitled "Color Demodulator."

The blue, green and red signals from the video signal processing circuits 14 are coupled, respectively, through signal coupling circuits 18, 20, and 22 to three electron guns 24, 26 and 28 of an image reproducing cathod ray tube 30 of the penetration color tube type. The tube 30 includes a phosphor screen 32, which is excited by the electron beams of the electron guns 24, 26 and 28, and is covered on the side nearer the guns 24, 26 and 28 by a thin conductive backing layer 34, such as aluminum, An internal coductive coating 36, "aquadag," for example, covers the inner surface of the funnel portion of the tube 30 and electrically contacts the backing layer 34.

In the particular penetration color tube 30 described, the highest velocity electron beam is produced by the first electron gun 24 and causes blue light to be emitted from the screen 32; the lowest velocity electron beam is produced by the third gun 28 and causes red light to be emitted; and a medium velocity electron beam is produced by the second gun 26 and causes green light to be emitted. The first electron gun 24 will be hereinafter referred to as the blue gun 24; the second electron gun 26 will be hereinafter referred to as the green gun 26; and the third electron gun 28 will be hereinafter referred to as the red gun 28.

Each of the electron guns 24, 26 and 28 includes, respectively, cathodes 38, 40, and 42, control electrodes 44, 46 and 48, screen electrodes 50, 52 and 54, focus electrodes 56, 58 and 60, and final accelerating anodes 62, 64, and 66. The final accelerating anodes 62, 64 and 66 are electrically connected together and are further connected to the internal conductive coating 36.

The manner in which the various operating voltages are applied to the tube 30 will be explained hereinafter.

The composite color video signal derived from the primary receiving circuits 12 is applied, as previously mentioned, to the synchronizing signal circuits 16 which remove the horizontal and vertical synchronizing signals. The vertical synchronizing signal is applied to a vertical deflection circuit 70 of the receiver which generates electrical signals that are applied to the vertical deflection windings (not shown) of an electron beam in a vertical direction on the phosphor screen 32 of the tube 30.

The horizontal synchronizing signals are applied to the horizontal oscillator and deflection control circuits 74, which may be of a conventional nature, to generate horizontal deflection signals that are applied to a horizontal output tube 76. The horizontal deflection signals are available at the anode of the horizontal output tube 76 and are applied to a horizontal output transformer 78 that includes a core 80, a main winding 90, a high voltage winding 92 and a tertiary winding 94. The high voltage end of each winding, that is, the end of each winding that goes highly positive during the retrace or flyback interval, is marked with a dot on the drawings. The anode of the horizontal output tube 76 is connected directly to the high voltage end of the main winding 90, and the horizontal deflection windings (not shown) of the yoke 72 are connected between the low voltage end of the winding 90 and an intermediate tap 96. Thus, the horizontal deflection signals are applied to the horizontal deflection windings (not shown) of the yoke 72 to scan the electron beams of the tube 30 horizontally across the phosphor screen 32. A damper diode 98 has its cathode connected to a second tap point 102 on the main winding 90 and its anode connected to a source of low voltage operating potential, +B, for the receiver, and through capacitor 106, commonly known as a B-boost capacitor, to the low voltage end of the main winding 90. A B-boost voltage is available at the low voltage end of the main winding 90.

In order to supply a direct operating voltage to the cathode of the red gun 28, that is to generate the lowest velocity electron beam, a first or (+) HV rectifier diode 108 has its anode 110 connected directly to the high voltage end of the main winding 90 and its cathode 112 connected to ground through a filter capacitor 114. Heater voltage for the heater 116 of the diode 108 is supplied by a link coupling 118 from the main winding 90. The (+) HV rectifier diode 108 rectifies the horizontal flyback pulse across the main winding 90 and provides a direct voltage, (+HV) voltage, positive with respect to ground, across the filter capacitor 114. The (+) HV voltage is connected directly to the cathode 42 of the red gun 28. The (+) HV voltage has a value on the order of several thousand volts, the exact value depending upon the particular penetration color tube 30 used.

The high voltage winding 92 has its low voltage end connected directly to the cathode 112 of the (+) HV rectifier diode 108 and its high voltage and end connected to the anode 122 of a (+) ultor rectifier diode 124.

The cathode 126 of the ultor rectifier diode 124 is connected to ground through a filter capacitor 128. Voltage is supplied to the heater 130 by a link coupling 132 on the high voltage winding 92. The total voltage rectified by the ultor rectifier diode 124 is equal to the amplitude of the flyback pulse across the high voltage winding 92 added to the direct voltage on the cathode 112 on the (+) HV rectifier diode 108. The direct voltage avilable across the filter capacitor 128 is used as the (+) ultor voltage is connected directly through the envelope of the tube 30 to the conductive coating 36. The conductive backing 34, the conductive coating 36, and the final accelerating anodes 62, 64 and 66 of the three electron guns are thus maintained at the +ultor voltage. The value of the (+) ultor voltage depends upon the particular type of structure used for the screen 32 but will normally be in the neighborhood of twenty thousand volts.

It will be seen that the total accelerating voltage for the red gun 28 is the numerical difference between the (+) HV voltage applied to its cathode 42 and the (+) ultor voltage applied to its final anode 66.

The cathode 40 of the green gun 26 is connected directly to ground or reference potential for the receiver, and its accelerating voltage is thus equal to the (+) ultor voltage. The electron beam of the green gun 26 is thus accelerated through a greater potential than that of the red gun 28 and possesses a higher velocity.

In order to supply the blue gun 24 with operating voltages so that its electron beam will have a higher velocity than either of the beams from the green gun 26 or the red gun 28, its cathode 38 must be connected to a source of potential more negative than that of the cathode 40 of the green gun 26. This voltage is provided by rectifying the flyback pulse available across the tertiary winding 94, to produce a negative direct voltage by connecting the cathode 134 of a third or (−) HV rectifier diode 136 directly to ground for the receiver and its anode 138 to the high voltage end of the tertiary winding 94. Heater voltage for the (−) HV rectifier diode 136 is provided by connecting the heater 140 through a link coupling 142 to the tertiary winding 94. The low voltage end of the tertiary winding 94 is connected to ground for the receiver through a filter capacitor 144. A direct voltage, (−) HV voltage, negative with respect to ground, is available across the filter capacitor 144 and is connected directly to the cathode 38 of the blue gun 24. Thus, the accelerating voltage for the blue gun 24 is equal to the sum of the absolute values of the (+) ultor voltage and the (−) HV voltage which impart to the electron beam of the blue gun 24 a higher velocity than either of the beams from the green gun 26 or red gun 28.

It is necessary to supply operating voltages to the screen electrodes 50, 52, and 54 of the electron guns 24, 26 and 28 but since the manner in which these voltages are developed and supplied may be conventional and forms no part of this invention such circuitry is not illustrated or described.

The electron guns 24, 26 and 28 have been shown as having focus electrodes 56, 58 and 60. As is well known in the art, all types of electron guns do not have focus electrodes and thus do not require focus voltages, but if such voltages are required they may be derived from bleeder circuits connected across the various high voltages circuits previously described. As illustrated in FIGURE 1, the red focus voltage may be derived from a bleeder circuit, which comprises a first limit resistor 146, a red focus potentiometer 148 having a variable tap 150, and a second limit resistor 152 serially connected between the cathode 126 of the (+) ultor rectifier diode 124 and the cathode 112 of the (+) HV rectifier diode 108. The limit resistors 146, 152 serve to reduce the range of the voltage available across the red focus potentiometer 148. The voltage available at the tap 150 is thus in a range intermediate of the (+) ultor voltage and (+) HV voltage and is connected from the variable tap 150 to a red focus terminal 60' of the red focus electrode 60 in the red gun 28. The proper focus voltage to provide the desired light spot size on the screen 32 may be selected by positioning the tap 150 on the potentiometer 148.

In like manner, focus voltage is supplied to the green gun 26 by using a bleeder between the cathode 112 of the (+) HV rectifier diode 108 and ground for the receiver which includes a third limit resistor 154, a green focus potentiometer 156, having a variable tap 158, and a fourth limit resistor 160. The variable tap 158 is connected directly to a green focus terminal 58' of the focus electrode 58 in the green gun 26. Focus voltage for the blue gun 24 is provided by a bleeder circuit comprising a fifth limit resistor 162, a blue focus potentiometer 164, having a variable tap 166, and a sixth limit resistor 168 serially connected between ground for the receiver and the filter capacitor 144. The variable tap 166 is connected directly to a blue focus terminal 56' of the focus electrode 56 in the blue gun 24.

Figure 2:
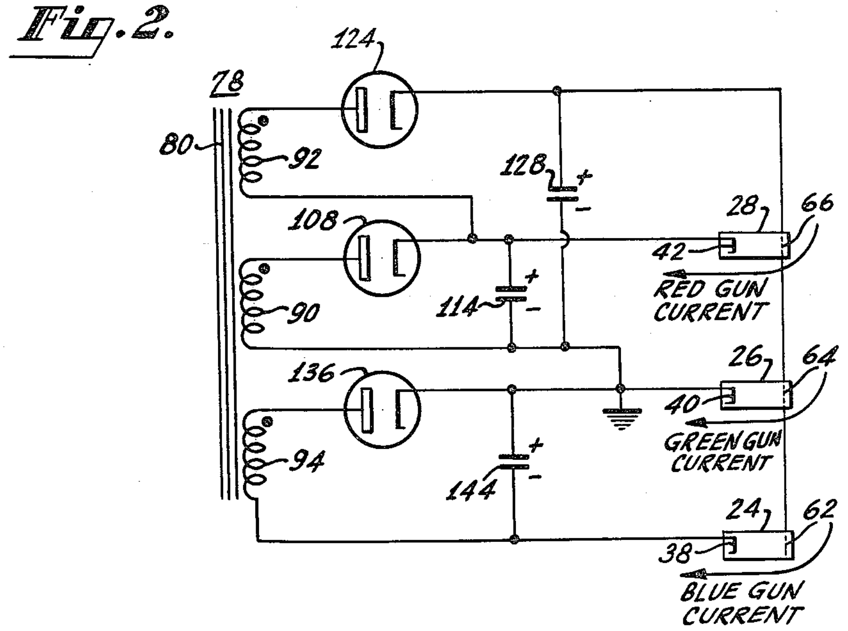
FIGURE 2 is a simplified schematic circuit diagram of the high voltage power supply circuit shown in FIGURE 1.

The manner of operation of the high voltage circuit together with its advantages may be seen by referring to the simplified schematic diagram of FIGURE 2, which includes the main, high voltage, and tertiary windings 90, 92 and 94, the rectifier diodes 108, 124 and 136, the filter capacitors 114, 128 and 144 and the electron guns 24, 26 and 28. The conventional current flow through each of the electron guns 24, 26 and 28 is shown by the labeled arrows associated with each gun.

Note particularly, that each of the electron guns has a direct current return across the power supply which provides its accelerating voltage. Thus, the current through any one of the guns 24, 26, 28 will not itself serve to charge any of the filter capacitors 114, 128, and 144. The relative regulation between the various supplies is good, since, if the flyback pulse across the high voltage winding 92 decreases, the flyback pulse across the main winding 90 and the tertiary winding 94 will also decrease maintaining the relative values of the +ultor, (+) HV, and (−) HV voltages constant. It will be appreciated that the tighter the coupling between the windings the better will be the relative regulation between the various power supplies.

In order to maintain the power taken from the transformer 78 (FIGURE 1) constant, even though the power taken by the penetration color tube 30 may vary the average brightness of image being reproduced, a voltage regulator tube 170 is connected to regulate the (+) ultor supply. The anode 172 of the regulator tube 170 is connected to the cathode 126 of the (+) ultor rectifier 124, and the cathode 174 of the regulator tube 170 is connected to a source of low voltage operating potential, +B, for the receiver. The control grid 176 of the regulator tube is connected to an intermediate tap on a resistive voltage divider 178 connected between B-boost and ground for the receiver. This type of voltage regulator is well known and operates on the fact that the amount of B-boost voltage generated is an indication of the power being drawn from the transformer 78. Thus, if the penetration color tube 30 takes more than a normal amount of power, there is less power available to generate B-boost voltage and the B-boost voltage decreases. The voltage across the voltage divider 178 in the grid circuit of the regulator tube 170 is thus reduced decreasing the bias on the regulator tube 170 and reducing the current drawn by the tube 170. The opposite action occurs if the power drawn by the penetration color tube 30 decreases. The sum of the power drawn by the penetration color tube 30 and the regulator tube 170 remains substantially constant, and thus the power drawn from the transformer 78 remains substantially constant. It is not necessary that the (+) ultor voltage be regulated to regulate the power taken from the transformer 78, since the power regulation may be obtained by regulating either the (+) HV voltage or the (−) HV voltage by the same kind of regulator tube used on the (+) ultor voltage.

It may also be desirable to use only a single winding on the transformer 78 from which to generate both the (+) HV and (−) HV voltages. The use of two separate windings for these supplies may require the use of an expensive transformer to secure the tight coupling between the main winding 90 and the tertiary winding 94 that is desired to give good relative regulation between the (+) HV and (−) HV voltages. The (−) HV voltage may be generated from across the main winding 90 in the manner shown in FIGURE 3, which is a partial schematic circuit diagram of a modification of the power supply circuits shown in FIGURE 1, and includes main and high voltage windings 90, 92, the (+) HV and (+) ultor rectifier diodes 108, 124 and the filter capacitors 114, 128, together with the damper tube 98 and the B-boots capacitor 106 that are identical to those shown in FIGURE 1, and operate in the same manner as the circuits of FIGURE 1. In order to develop the (−) HV voltage, however, the anode 180 of a (−) HV rectifier diode 182 is connected to the high voltage end of the main winding 90 through a capacitor 184, and the cathode 186 of the diode 182 is connected directly to ground for the receiver. Flyback pulses from the main winding 90 charge the capacitor 184 through the diode 182 so that the plate of the capacitor 184 connected to the anode 180 of the diode 182 is made negative with respect to ground to provide the (−) HV voltage. An isolating diode 188 has its cathode 190 connected to the anode 180 of the (−) HV rectifier diode 182 and its anode 192 connected to the cathode 38 of the blue gun 24 shown in FIGURE 1. The isolating diode 188 serves to prevent the flyback pulse from being shorted to ground during the pulse interval by the cathode load of the blue gun 24.

Figure 3:
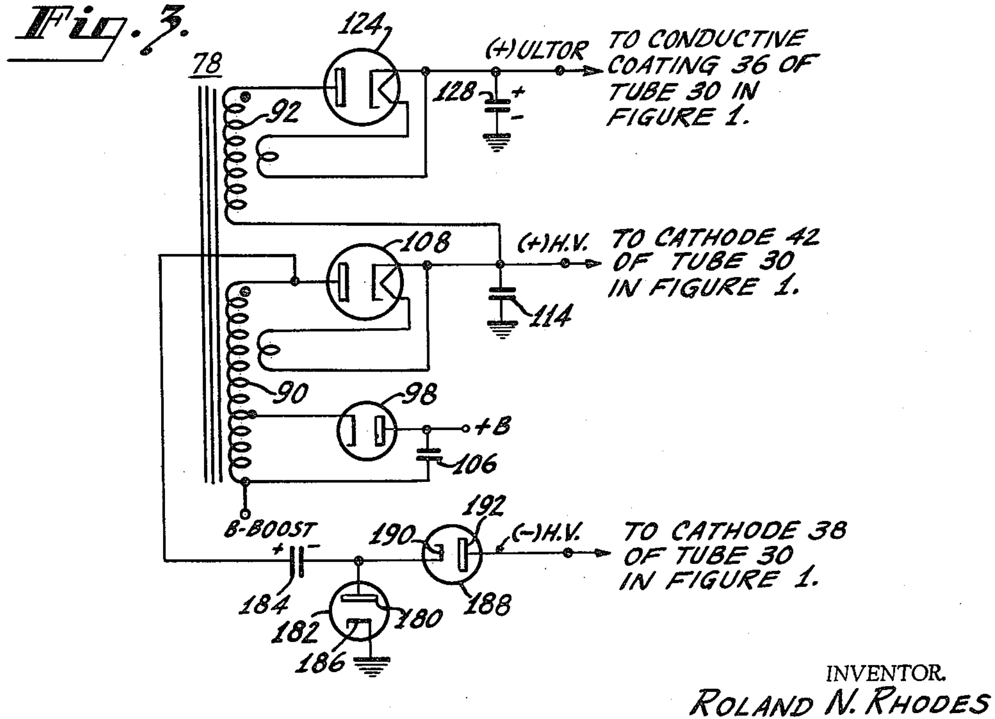
FIGURE 3 is a schematic circuit diagram of a portion of a high voltage power supply illustrating another embodiment of the invention.

In FIGURE 3, the relative regulation between the +HV voltage and the (−) HV voltage is independent of any coupling factors between the windings of the transformer 78 and thus, the two voltages will track closely if the amplitude of the flyback pulse should vary.

The high voltage supply circuits described herein provide direct operating voltages for a penetration color tube from a single source, without producing undesirable cross effects between the three separate power supplies, because of the different loading of the three electron guns of the tube, yet maintaining a high degree of relative regulation between the operating voltages.

What is claimed is:

1. In a television receiver having an image reproducing cathode ray tube including a plurality of electron guns, each having a cathode and an accelerating anode, to produce a plurality of electron beams, said receiver further having an electron beam deflection circuit including a transformer having first and second windings across which high voltage retrace pulses are developed, each winding including high and low pulse voltage end terminals, a direct voltage generating circuit for supplying operating voltages to the electron guns of said tube, comprising in combination:

a first rectifier having an anode and a cathode;

means connecting the low pulse voltage end terminal of said first winding to a point of reference potential for said receiver;

means connecting the anode of said first rectifier to the high pulse voltage end terminal of said first winding for rectifying the retrace pulse across said winding to develop a first direct voltage at the cathode of said rectifier;

means for applying said first direct voltage to the cathode of one of said plurality of electron guns;

means connecting the low pulse voltage end terminal of said second winding to the cathode of the first rectifier;

a second rectifier having a cathode and an anode;

means connecting the anode of said second rectifier to the high pulse voltage end terminal of said second winding for rectifiying the voltage on the anode of said second rectifier to develop a second direct voltage at the cathode of said second rectifier;

means for applying said second direct voltage to the accelerating anodes of said plurality of electron guns to provide in conjunction with said first direct voltage an accelerating voltage between the cathode and accelerating anode of said one of said plurality of electron guns; and means for connecting the cathode of another of said plurality of electron guns to the point of reference potential for said receiver to provide in conjunction with said second direct voltage on the accelerating anode of said last named electron gun an accelerating voltage for said last named electron gun greater than the accelerating voltage for said one of said plurality of electron guns.

2. In a television receiver having an image reproducing cathode ray tube including a plurality of electron guns, each having a cathode and an accelerating anode, to produce a plurality of electron beams, said receiver further having an electron beam deflection circuit including a transformer having first and second windings across which high voltage retrace pulses are developed, each winding including high and low pulse voltage end terminals, a direct voltage generating circuit for supplying operating voltages to the electron guns of said tube, comprising in combination:

a first rectifier having an anode and a cathode;

means connecting the low pulse voltage end terminal of said first winding to a point of reference potential for said receiver;

means connecting the anode of said first rectifier to the high pulse voltage end terminal of said first winding for rectifying the retrace pulse across said winding to develop a first direct voltage at the cathode of said first rectifier having a value responsive to the amplitude of the retrace pulse across said first winding;

means for applying said first direct voltage to the cathode of one of said plurality of electron guns;

means for connecting the low voltage end terminal of the second winding to the cathode of the first rectifier;

a second rectifier having a cathode and an anode;

means for connecting the anode of said second diode to the high pulse voltage end terminal of said second winding for rectifying the voltage on the anode of said second rectifier to develop a second direct voltage at the cathode of said second rectifier having a value responsive to the amplitude of the retrace pulse across said second winding and the amplitude of the direct voltage on the cathode of said first rectifier;

means for applying said second direct voltage to the accelerating anodes of said plurality of the electron guns to provide in conjunction with the first direct voltage on the cathode of said one of said plurality of electron guns an accelerating voltage between the cathode and accelerating anode of said one of said plurality of electron guns; and means for connecting the cathode of another of said plurality of electron guns to the point of reference potential for said receiver to provide in conjunction with the second direct voltage on the accelerating anode of said last named electron gun an accelerating voltage between the cathode and accelerating anode of said last named electron gun greater than the accelerating voltage for said one of said plurality of electron guns.

3. In a television receiver having an image reproducing cathode ray tube including three electron guns to produce three electron beams, each electron gun having a cathode and an accelerating anode, said receiver further having an electron beam deflection circuit including a transformer across which high voltage retrace pulses are developed, a high direct voltage generating circuit for supplying operating voltage to the electron guns of said tube, comprising in combination:

means including a first rectifier, having a diode, responsive to retrace pulses across said transformer for developing a first positive direct voltage between the cathode of said first rectifier and a point of reference potential for said receiver;

means for applying said first positive direct voltage to the cathode of a first electron gun;

means including a second rectifier having a cathode, responsive to said first positive direct voltage and said retrace pulses for developing a second positive direct voltage between the cathode of said second rectifier and the point of reference potential for said receiver;

means for applying said second positive direct voltage to the accelerating anodes of said electron guns to provide in conjunction with said first positive direct voltage an accelerating voltage between the accelerating anode and cathode of said first electron gun;

means for connecting the cathode of a second electron gun to the point of reference potential for said receiver to provide in conjunction with said second positive direct voltage on the accelerating anode of said second electron gun an accelerating voltage between the accelerating anode and the cathode of said second electron gun greater than the accelerating voltage between the accelerating anode and the cathode of said first electron gun;

means including a third rectifier responsive to said retrace pulses for developing a negative direct voltage; and means for applying said negative direct voltage to the cathode of a third electron gun to provide in conjunction with said second positive direct voltage on the accelerating anode of said third electron gun an accelerating voltage between the accelerating anode and the cathode of said third electron gun greater than the accelerating voltage between the cathodes and accelerating anodes of said first and second electron guns.

4. In a television receiver having an image reproducing cathode ray tube including three electron guns to produce three electron beams, each electron gun having a cathode and an accelerating anode, said receiver further having an electron beam deflection circuit including a transformer across which high voltage retrace pulses are developed, a high voltage generating circuit for supplying operating voltages to the electron guns of said tube, comprising in combination:

a first rectifier having an anode and a cathode;

means for applying a portion of the retrace pulses across said transformer between the anode of said first rectifier and a point of reference potential for said receiver to develop a first direct positive voltage at the cathode of said diode;

means for applying said first direct voltage to the cathode of a first electron gun;

a second rectifier having a cathode and an anode;

means connected between the anode of said second rectifier and the cathode of said first rectifier for applying a further portion of said retrace pulses and said first direct voltage to the anode of said second rectifier to develop a second direct positive voltage between the cathode of said second rectifier and the point of reference potential for said receiver;

means for applying said second direct voltage to the accelerating anodes of said electron guns to provide in conjunction with said first direct voltage on the cathode of said first electron gun an accelerating voltage between the cathode and accelerating anode of said first electron gun;

means for connecting the cathode of a second electron gun to a point of reference potential for said receiver to provide in conjunction with said second direct positive voltage on the accelerating anode of said second electron gun an accelerating voltage between the cathode and the accelerating anode of said electron gun greater than the accelerating voltage between the cathode and accelerating anode of said first electron gun;

a third rectifier having an anode and a cathode;

means for applying said retrace pulses between the anode and cathode of said third rectifier to develop a negative direct voltage; and means for applying said negative direct voltage to the cathode of a third electron gun to provide in conjunction with said second direct voltage on the accelerating anode of said third electron gun an accelerating voltage between the accelerating anode and cathode of said third electron gun greater than the accelerating voltage between the accelerating anodes and cathodes of said first and second electron guns.

5. In a television receiver having an image reproducing cathode ray tube including three electron guns to produce three electron beams, each electron gun having a cathode and an accelerating anode, said receiver further having an electron beam deflection circuit including a transformer across which high voltage retrace pulses are developed, a high voltage generating circuit for supplying operating voltages to the electron guns of said tube, comprising in combination:

a first rectifier having an anode and a cathode;

means for applying a portion of the retrace pulses across said transformer between the anode of said first rectifier and a point of reference potential for said receiver to develop a first direct positive voltage at the cathode of said rectifier;

means for applying said first direct voltage to the cathode of a first electron gun, a second rectifier having a cathode and an anode;

means connected between the anode of said rectifier and the cathode of said first rectifier for applying a further portion of said retrace pulses and said first direct voltage to the anode of said second rectifier to develop a second direct positive voltage between the cathode of said second rectifier and the point of reference potential for said receiver;

means for applying said second direct voltage to the accelerating anodes of said electron guns;

means for connecting the cathode of a second electron gun to the point of reference potential for said receiver;

a third rectifier having an anode and a cathode;

means for applying said retrace pulses between the anode and cathode of said third rectifier to develop a negative direct voltage; and means for applying said negative direct voltage to the cathode of a third electron gun.

6. In a television receiver having an image reproducing cathode ray tube including a plurality of electron guns to produce a plurality of electron beams, each electron gun having a cathode and an accelerating anode, said receiver further having an electron beam deflection circuit including a transformer across which high voltage retrace pulses are developed, a direct voltage generating circuit for supplying operating voltages to the electron guns of said tube, comprising in combination:

means including a first rectifier circuit responsive to retrace pulses across said transformer for developing a first direct voltage positive with respect to a point of reference potential for said receiver;

means for applying said first direct voltage to the cathode of a first electron gun;

means including a second rectifier circuit responsive to said first direct voltage and to said retrace pulses for developing a second direct voltage positive with respect to the point of reference potential for said receiver;

means for applying said second direct voltage to the accelerating anodes of said electron guns; and means for connecting the cathode of a second electron gun to the point of reference potential for said receiver.

No references cited.